(12) United States Patent
Ishii

(10) Patent No.: US 8,520,343 B2
(45) Date of Patent: Aug. 27, 2013

(54) SUSPENSION BOARD WITH CIRCUIT HAVING AN OPENING FORMED IN THE METAL SUPPORTING BOARD AT A SLIDER MOUNTING REGION

(75) Inventor: Jun Ishii, Osaka (JP)

(73) Assignee: Nitto Denko Corporation, Osaka (JP)

( * ) Notice: Subject to any disclaimer, the term of this patent is extended or adjusted under 35 U.S.C. 154(b) by 169 days.

(21) Appl. No.: 13/067,148

(22) Filed: May 12, 2011

(65) Prior Publication Data
US 2011/0286132 A1    Nov. 24, 2011

Related U.S. Application Data

(60) Provisional application No. 61/344,149, filed on Jun. 1, 2010.

(30) Foreign Application Priority Data

May 20, 2010    (JP) .................................. 2010-116595

(51) Int. Cl.
    *G11B 5/48*    (2006.01)
(52) U.S. Cl.
    USPC ..................................... 360/245.9; 360/245.3
(58) Field of Classification Search
    USPC ................ 360/245.9, 245.8, 245.3; 174/260; 216/13
    See application file for complete search history.

(56) References Cited

U.S. PATENT DOCUMENTS

| | | | |
|---|---|---|---|
| 7,525,764 B2 * | 4/2009 | Ohsawa et al. | 360/234.5 |
| 8,097,811 B2 * | 1/2012 | Hitomi et al. | 174/250 |
| 2005/0248885 A1 * | 11/2005 | Funada et al. | 360/245.9 |
| 2008/0278858 A1 * | 11/2008 | Ishii et al. | 360/245.9 |
| 2010/0000774 A1 * | 1/2010 | Naito et al. | 174/260 |
| 2010/0033875 A1 * | 2/2010 | Yoshida et al. | 360/244.1 |
| 2012/0048609 A1 * | 3/2012 | Ohnuki | 174/260 |
| 2012/0092836 A1 * | 4/2012 | Ohsawa | 361/748 |
| 2012/0175151 A1 * | 7/2012 | Mizutani | 174/250 |
| 2013/0021699 A1 * | 1/2013 | Ohsawa | 360/245.8 |

FOREIGN PATENT DOCUMENTS

JP    2010-040115    2/2010

* cited by examiner

*Primary Examiner* — Brian Miller
(74) *Attorney, Agent, or Firm* — Jean C. Edwards, Esq.; Edwards Neils PLLC

(57) ABSTRACT

A suspension board with circuit includes a metal supporting board, an insulating layer formed on the metal supporting board, and a conductive pattern formed on the insulating layer and having a terminal portion connected to connecting terminals of a magnetic head mounted on a slider. A slider mounting region where the slider is disposed is defined, and a plurality of the terminal portions are spaced apart from each other in the slider mounting region, and in the metal supporting board, an opening which opens so as to expose the insulating layer where the terminal portions are disposed is formed at the slider mounting region.

7 Claims, 4 Drawing Sheets

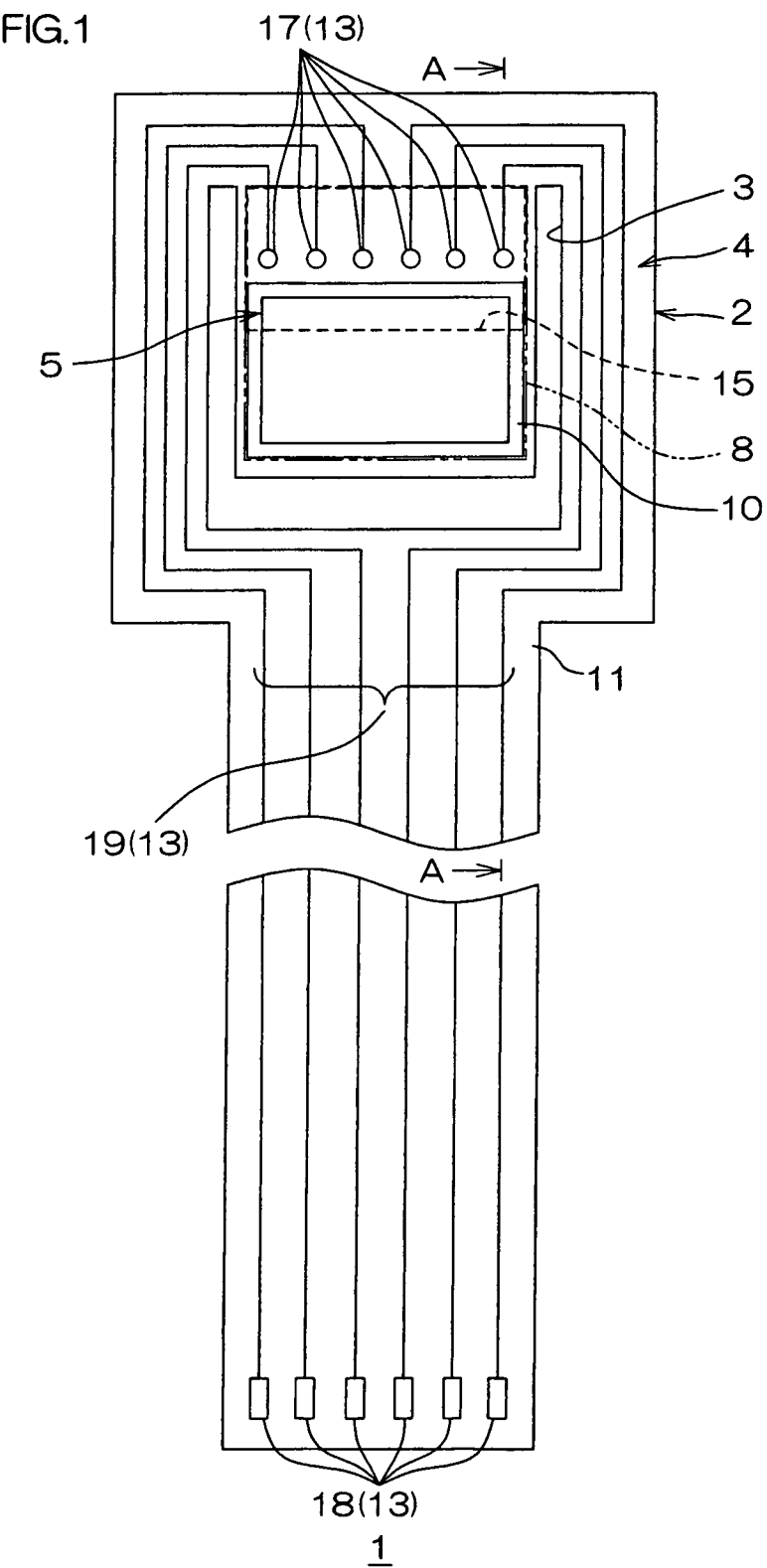

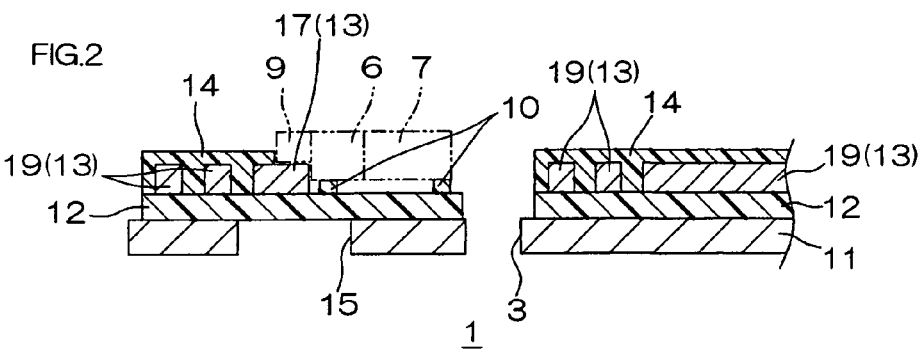
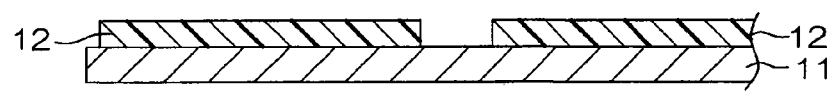
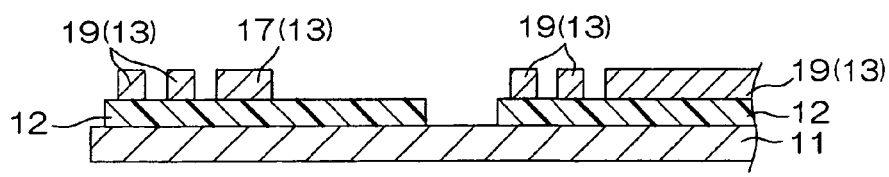
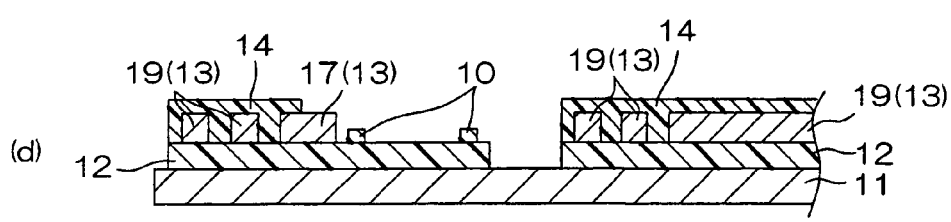
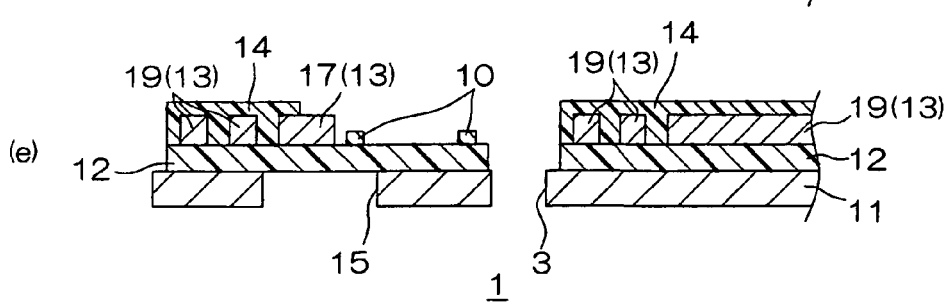

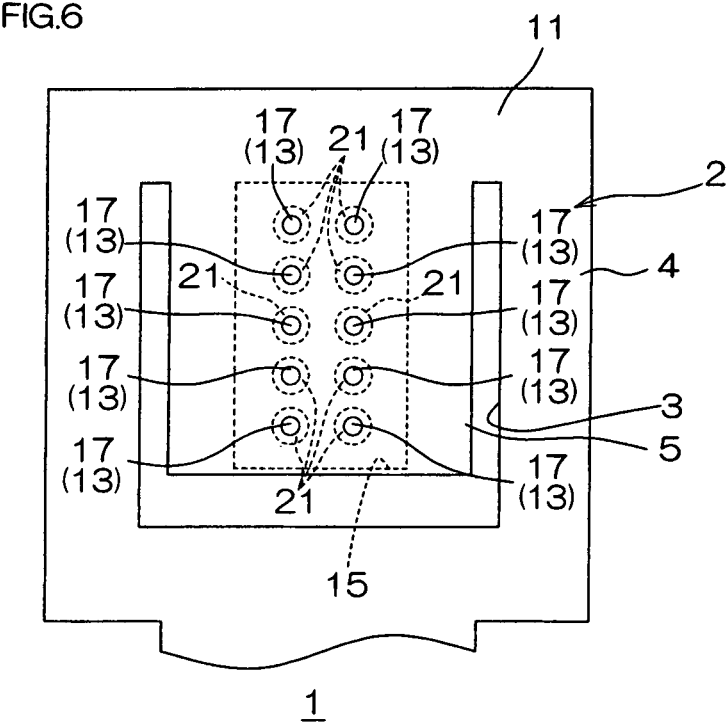
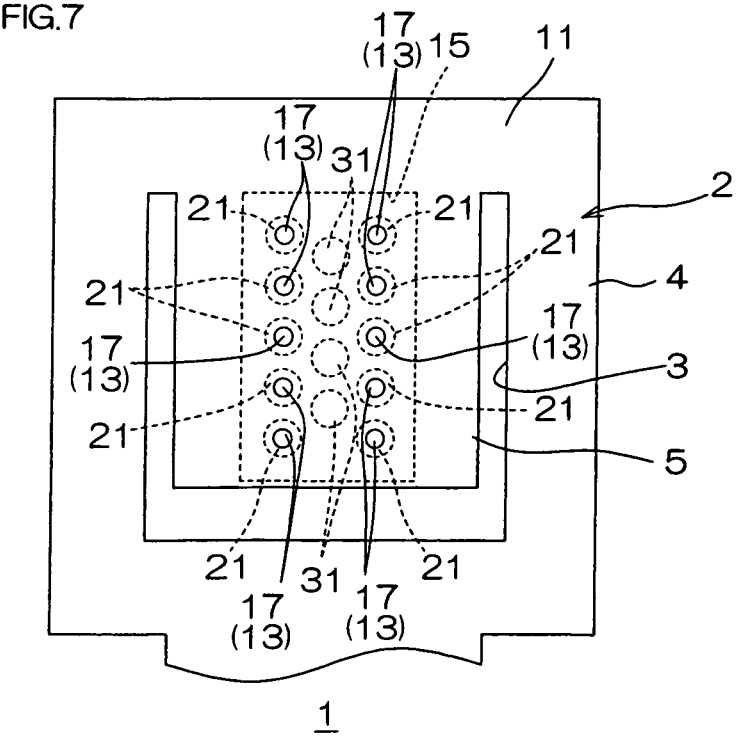

SUSPENSION BOARD WITH CIRCUIT HAVING AN OPENING FORMED IN THE METAL SUPPORTING BOARD AT A SLIDER MOUNTING REGION

CROSS-REFERENCE TO RELATED APPLICATION

The present application claims the benefit of U.S. Provisional Application No. 61/344,149 filed on Jun. 1, 2010, and claims priority from Japanese Patent Application No. 2010-116595 filed on May 20, 2010, the contents of which are herein incorporated by reference into this application.

BACKGROUND OF THE INVENTION

Field of the Invention

The present invention relates to a suspension board with circuit mounted with a magnetic head in a hard disk drive and a producing method thereof.

Conventionally, a suspension board with circuit mounted with a magnetic head has been used in a hard disk drive. For example, a suspension board with circuit where an insulating base layer and a conductive pattern are sequentially laminated on a metal supporting board formed of stainless steel or the like has been known (cf. Japanese Unexamined Patent Publication No. 2010-40115).

In the suspension board with circuit, while a slider with a magnetic head mounted thereon is mounted on a magnetic head mounting region of the metal supporting board, connecting terminals of the magnetic head and head-side terminals are connected.

SUMMARY OF THE INVENTION

However, in the suspension board with circuit described in Japanese Unexamined Patent Publication No. 2010-40115, when environmental temperature changes, the metal supporting board and the slider expand at a different rate due to the difference between the coefficient of thermal expansion of the metal supporting board and that of the slider.

Then, a distortion is caused in the connecting portion between the connecting terminals of the magnetic head mounted on the slider and the head-side terminals, so that a crack can occur in the connecting portion between the connecting terminals of the magnetic head and the head-side terminals.

It is therefore an object of the present invention to provide a suspension board with circuit capable of relaxing stress applied on the connecting portion between connecting terminals of a magnetic head and a terminal portion and capable of reliably maintaining the connection of them.

The suspension board with circuit of the present invention includes a metal supporting board, an insulating layer formed on the metal supporting board, and a conductive pattern formed on the insulating layer and having a terminal portion connected to a connecting terminal of a magnetic head mounted on a slider, wherein a slider mounting region where the slider is disposed is defined, a plurality of the terminal portions are spaced apart from each other in the slider mounting region, and in the metal supporting board, an opening which opens so as to expose the insulating layer where the terminal portions are disposed is formed at the slider mounting region.

In the suspension board with circuit of the present invention, it is preferable that a first reinforcing portion made of the metal supporting board is provided corresponding to the terminal portion in the opening at the slider mounting region.

In the suspension board with circuit of the present invention, it is preferable that a second reinforcing portion made of the metal supporting board is provided so as to be separated from the first reinforcing portion in the opening at the slider mounting region.

The method for producing a suspension board with circuit according to the present invention includes the steps of laminating a metal supporting board, an insulating layer formed on the metal supporting board, and a conductive pattern formed on the insulating layer and having a terminal portion connected to a connecting terminal of a magnetic head mounted on a slider; and etching the metal supporting board so as to expose the under surface of the insulating layer where the terminal portion is disposed at the slider mounting region where the slider is disposed.

In the suspension board with circuit obtained by using the producing method of the suspension board with circuit of the present invention, the opening which opens so as to expose the insulating layer is formed in the metal supporting board at the slider mounting region where the terminal portion is disposed.

Therefore, even when a stress is applied on the connecting portion between a connecting terminal of the magnetic head and the terminal portion due to change of environmental temperature, so that the metal supporting board and the slider expand at a different rate, the stress can be relaxed in the opening.

As a result, the connecting reliability between the connecting terminals of the magnetic head and the terminal portion can be improved.

BRIEF DESCRIPTION OF THE DRAWINGS

FIG. 1 is a partially omitted plan view illustrating a suspension board with circuit of a first embodiment according to the present invention;

FIG. 2 is a sectional view, taken along the line A-A of a gimbal portion shown in FIG. 1;

FIG. 3 is a process view illustrating an embodiment of the method for producing the suspension board with circuit according to the present invention,
  (a) showing the step of preparing a metal supporting board,
  (b) showing the step of forming an insulating base layer,
  (c) showing the step of forming a conductive pattern,
  (d) showing the step of forming an insulating cover layer and a pedestal,
  (e) showing the etching step of etching a metal supporting board;

FIG. 6 is an explanatory view (plan view) illustrating a modified example of the suspension board with circuit of a third embodiment according to the present invention;

FIG. 7 is an explanatory view (plan view) illustrating the suspension board with circuit of a fourth embodiment according to the present invention.

DETAILED DESCRIPTION OF PREFERRED EMBODIMENTS

Figure 4:
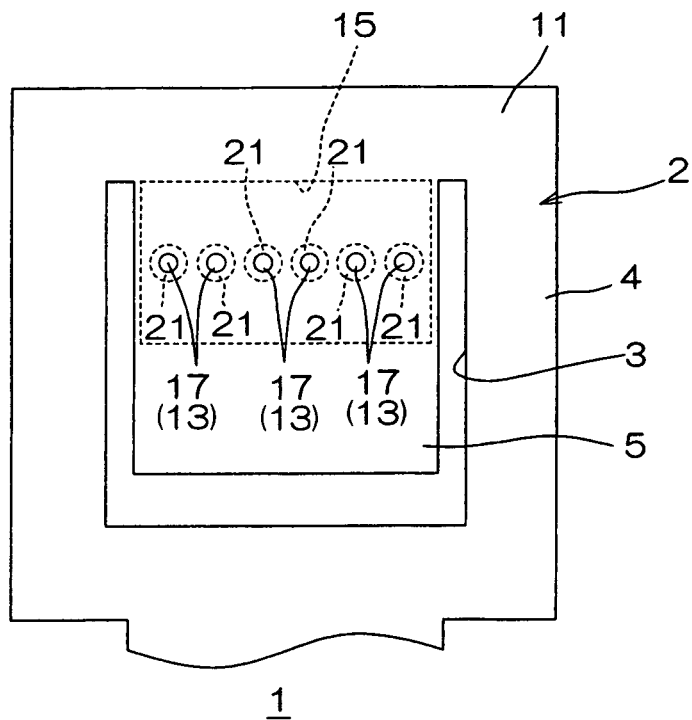
FIG. 4 is an explanatory view (plan view) illustrating the suspension board with circuit of a second embodiment according to the present invention.

FIG. 1 is a partially omitted plan view illustrating a suspension board with circuit of a first embodiment according to the present invention; FIG. 2 is a sectional view, taken along the line A-A of a gimbal portion shown in FIG. 1.

As shown in FIG. 1, a suspension board with circuit 1 is formed in a generally flat belt shape extending in a lengthwise direction. In the suspension board with circuit 1, a gimbal portion 2 is provided at one end portion in the lengthwise direction for mounting a slider 7 (showing phantom lines in FIG. 2) with a magnetic head 6 (showing phantom lines in FIG. 2) mounted thereon.

The gimbal portion 2 is formed in a generally rectangular shape in plane view and nearly at the center thereof, a cutout portion 3 which is cut into a generally U-shape in plane view opening toward one side in the lengthwise direction is formed. In the gimbal portion 2, an outrigger portion 4 and a tongue portion 5 are defined so as to be separated by the cutout portion 3.

The outrigger portion 4 is an outer portion of the cutout portion 3 in the gimbal portion 2 and is formed into a generally rectangular frame shape in plane view.

The tongue portion 5 is an inner portion of the cutout portion 3 in the gimbal portion 2 and is formed in a generally rectangular shape in plane view continuously extending from one end portion in the lengthwise direction of the outrigger portion 4 toward the other side in the lengthwise direction. Further, a slider mounting region 8 where the slider 7 is mounted is defined in the tongue portion 5.

The slider mounting region 8 is formed into a generally rectangular shape in plane view over the almost whole area of the tongue portion 5.

As shown in FIGS. 1 and 2, the suspension board with circuit 1 includes a metal supporting board 11, an insulating base layer 12 as an insulating layer formed on the metal supporting board 11, a conductive pattern 13 formed on the insulating base layer 12, and an insulating cover layer 14 formed on the insulating base layer 12 so as to cover the conductive pattern 13.

The metal supporting board 11 is formed in a shape corresponding to the outer shape of the suspension board with circuit 1.

The insulating base layer 12 is formed, except for the portion where the cutout portion 3 is formed, on the portion where the conductive pattern 13 is formed and on the entire surface of the tongue portion 5.

The conductive pattern 13 extends along the lengthwise direction of the suspension board with circuit 1 and integrally includes a plurality (six pieces) of head-side terminals 17, as a terminal portion, which are connected to connecting terminals 9 of the magnetic head 6, a plurality (six pieces) of external terminals 18 which are connected to external boards such as a read/write board, and a plurality (six pieces) of wires 19 which connect each of the head-side terminals 17 to the respective corresponding external terminals 18.

The head-side terminals 17 each are formed in a generally circular shape in plane view (circular land shape) and are arranged in parallel at spaced intervals to each other in the widthwise direction perpendicular to the lengthwise direction at one end portion of the lengthwise direction in the slider mounting region 8.

The external terminals 18 each are formed in a generally rectangular shape in plane view (square land shape) and are arranged in parallel at spaced intervals to each other in the widthwise direction at the other end portion of the lengthwise direction in the suspension board with circuit 1.

The wires 19 each extend toward one side in the lengthwise direction from the external terminals 18 each, and in the gimbal portion 2, extend toward one side in the lengthwise direction while bending to expand in the widthwise direction corresponding to the outrigger portion 4, and at one end portion of the lengthwise direction in the gimbal portion 2, turn back toward the other side of the lengthwise direction to be finally connected to the head-side terminals 17 each at the slider mounting region 8.

As shown in FIG. 2, the insulating cover layer 14 is formed on the insulating base layer 12 so as to cover the wires 19 each and to expose (not shown) the head-side terminals 17 each and the external terminals 18 each.

In the suspension board with circuit 1, an opening 15 is formed in the metal supporting board 11 at the slider mounting region 8.

The opening 15 is formed in a generally rectangular shape in bottom plan view extending in the widthwise direction so as to pass through the metal supporting board 11 in the thickness direction at half part of one side of the lengthwise direction in the slider mounting region 8, while exposing the insulating base layer 12 from the lower side.

More particularly, the opening 15 is formed as one opening so as to include the head-side terminals 17 each when projected in the laminating direction (the laminating direction of the metal supporting board 11, the insulating base layer 12, the conductive pattern 13, and the insulating cover layer 14; hereinafter the same). Further, the opening 15 is not formed at half part of the other side of the lengthwise direction in the slider mounting region 8 where the slider 7 is mounted.

In the suspension board with circuit 1, a pedestal 10 is provided for supporting the slider 7 at the slider mounting region 8.

The pedestal 10 is formed in a generally rectangular frame shape in plane view on the insulating base layer 12 at half part of the other side of the lengthwise direction in the slider mounting region 8.

FIG. 3 is a process view illustrating an embodiment of the method for producing the suspension board with circuit according to the present invention, (a) showing the step of preparing a metal supporting board, (b) showing the step of forming an insulating base layer, (c) showing the step of forming a conductive pattern, (d) showing the step of forming an insulating cover layer and a pedestal, (e) showing the etching step of etching a metal supporting board.

Next, a method for producing the suspension board with circuit 1 is described with reference to FIG. 3.

First, in this method, as a laminating process, a metal supporting board 11, an insulating base layer 12, a conductive pattern 13, and an insulating cover layer 14 are sequentially formed.

As shown in FIG. 3(a), in the laminating process, the metal supporting board 11 is first prepared.

As a metal for forming the metal supporting board 11, for example, stainless steel, 42-alloy or the like is used, and stainless steel is preferably used.

The coefficient of thermal expansion of the metal supporting board 11 is in the range of, for example, $10 \times 10^{-6}$ to $20 \times 10^{-6}$/° C., or preferably $12 \times 10^{-6}$ to $18 \times 10^{-6}$/° C.

The metal supporting board 11 has a thickness in the range of, for example, 8 to 50 μm, or preferably 10 to 30 μm.

Next, as shown in FIG. 3(b), the insulating base layer 12 is formed on the metal supporting board 11.

As an insulating material for forming the insulating base layer 12, for example, synthetic resin such as polyimide, polyether nitrile, polyether sulfone, polyethylene terephthalate, polyethylene naphthalate, polyvinyl chloride is used. Of these, a photosensitive synthetic resin is preferably used, or photosensitive polyimide is more preferably used.

To form the insulating base layer 12, for example, a solution of photosensitive synthetic resin is applied to the surface of the metal supporting board 11 and is then dried. Thereafter, the dried resin is exposed to light with a pattern where the insulating base layer 12 is formed and is then developed to be hot cured as required.

Further, the insulating base layer 12 can also be formed, for example, by preliminarily forming a synthetic resin into a film having the above-mentioned pattern, and by adhesively bonding the film to the surface of the metal supporting board 11 via a known adhesive layer.

The insulating base layer 12 has a thickness in the range of, for example, 1 to 20 μm, or preferably 8 to 15 μm.

Next, as shown in FIG. 3(*c*), the conductive pattern 13 is formed on the insulating base layer 12.

As a conductive material for forming the conductive pattern 13, for example, copper, nickel, gold, tin, solder, or alloys thereof is used. Of these, copper is preferably used.

To form the conductive pattern 13, a known patterning method such as an additive method or a subtractive method is used, or the additive method is preferably used.

In the additive method, specifically, a conductive seed film is first formed on the surface of the metal supporting board 11 including the insulating base layer 12 by a sputtering method or the like. Then, a plating resist is formed on the surface of the conductive seed film in a pattern reverse to the conductive pattern 13. Subsequently, the conductive pattern 13 is formed on the surface of the conductive seed film on the insulating base layer 12 exposed from the plating resist by electrolytic plating. Thereafter, the plating resist and the portion of the conductive seed film where the plating resist is laminated are removed.

The conductive pattern 13 has a thickness in the range of, for example, 3 to 50 μm, or preferably 5 to 25 μm.

In the conductive pattern 13, the wire 19 has a width in the range of, for example, 10 to 100 μm, or preferably 12 to 50 μm, and a spacing between each of the wires 19 is in the range of, for example, 10 to 100 μm, or preferably 12 to 50 μm.

Further, in the conductive pattern 13, the head-side terminal 17 has a diameter in the range of, for example, 10 to 100 μm, or preferably 12 to 50 μm, and a spacing between each of the head-side terminals 17 is in the range of, for example, 10 to 100 μm, or preferably 12 to 50 μm.

Next, as shown in FIG. 3(*d*), on the insulating base layer 12, the insulating cover layer 14 is formed so as to cover the conductive pattern 13, and the pedestal 10 is formed. An insulating material for forming the insulating cover layer 14 and the pedestal 10 includes the same material as that for the insulating base layer 12.

To form the insulating cover layer 14 and the pedestal 10, for example, a solution of photosensitive synthetic resin is applied to the surface of the insulating base layer 12 including the conductive pattern 13 and is then dried. Thereafter, the dried resin is exposed to light with the above-mentioned pattern (the pattern corresponding to the insulating cover layer 14 and the pedestal 10) and is then developed to be hot cured as required.

Further, the insulating cover layer 14 and the pedestal 10 can also be formed, for example, by preliminarily forming a synthetic resin into a film having the above-mentioned pattern, and by adhesively bonding the film to the surface of the insulating base layer 12 including the conductive pattern 13 via a known adhesive layer.

The insulating cover layer 14 and the pedestal 10 have a thickness in the range of, for example, 2 to 25 μm, or preferably 3 to 10 μm.

The pedestal 10 is formed so that the length in both widthwise and lengthwise directions thereof is corresponding to the length in both widthwise and lengthwise directions of the slider 7.

Next, in this method, as an etching step, the metal supporting board 11 is etched to form the cutout portion 3 and the opening 15, whereby the under surface of the insulating base layer 12 is exposed from the opening 15 of the metal supporting board 11 at the slider mounting region 8.

For the etching of the metal supporting board 11, a known method is used, and for example, after masking all the portions other than the portion where the cutout portion 3 and the opening 15 are formed, chemical etching is applied.

Specifically, for example, using an aqueous ferric chloride solution or the like as an etchant, wet etching (chemical etching) method is used with spray or dipping.

Thus, the cutout portion 3 is formed in the metal supporting board 11, so that the outrigger portion 4 and the tongue portion 5 are defined thereto, while the opening 15 is formed at the slider mounting region 8.

The cutout portion 3 has a slit width in the range of, for example, 30 to 1000 μm, or preferably 50 to 500 μm.

The tongue portion 5 has a widthwise length in the range of, for example, 200 to 2000 μm, or preferably 200 to 1000 μm.

Each part of the outrigger portion 4 has a widthwise length in the range of, for example, 30 to 500 μm, or preferably 50 to 300 μm.

The opening 15 has a widthwise length in the range of, for example, 150 to 1900 μm, or preferably 200 to 900 μm. The opening 15 has a lengthwise length in the range of, for example, 100 to 500 μm, or preferably 200 to 400 μm.

A spacing between each of the lengthwise end edges of the head-side terminals 17 and the lengthwise end edges of the opening 15 is in the range of, for example, 20 to 500 μm, or preferably 50 to 200 μm. A spacing between the widthwise outer end edge of the head-side terminal 17 which is arranged most outside in the widthwise direction and the widthwise outer end edge of the opening 15 is in the range of, for example, 20 to 500 μm, or preferably 50 to 200 μm.

Next, in this method, the head-side terminals 17 are plated as required.

A method of plating and a metal for plating are not particularly limited and for example, a nickel plating layer and a gold plating layer are laminated by sequentially conducting electrolytic nickel plating and electrolytic gold plating.

The nickel plating layer and the gold plating layer both preferably have a thickness in the range of 1 to 5 μm.

Thus, the suspension board with circuit 1 is produced.

Thereafter, in the suspension board with circuit 1, as shown in phantom lines in FIG. 2, the slider 7 with the magnetic head 6 mounted thereon is mounted on the slider mounting region 8.

More particularly, the slider 7 is mounted on the insulating base layer 12 via an adhesive by filling the adhesive (not shown) inside the pedestal 10. The connecting terminals 9 of the magnetic head 6 are solder connected to the head-side terminals 17 at the one side end portion of the lengthwise direction in the slider mounting region 8.

The slider 7 is made of, for example, ceramics and the coefficient of thermal expansion thereof is in the range of, for example, more than 0 and $10 \times 10^{-6}/°$ C. or less, or preferably $1 \times 10^{-6}$ to $5 \times 10^{-6}/°$ C.

In the suspension board with circuit 1, the opening 15 which opens so as to expose the insulating base layer 12 is formed in the metal supporting board 11 at the slider mounting region 8 where the head-side terminals 17 are arranged.

Therefore, even when a stress is applied on the connecting portion between the connecting terminals 9 of the magnetic head 6 and the head-side terminals 17 due to change of environmental temperature, so that the metal supporting board 11 and the slider 7 expand at a different rate, the stress can be relaxed in the opening 15.

More particularly, the coefficient of thermal expansion of the metal supporting board 11 is usually larger than that of the slider 7, so that the metal supporting board 11 expands even larger with respect to the expansion of the slider 7 due to change of environmental temperature. In that case, since the connecting portion between the connecting terminals 9 of the magnetic head 6 and the head-side terminals 17 is stronger than that between the slider 7 and the insulating base layer 12, so that a crack can easily occur in the connecting portion when stress caused by the difference of the coefficient of thermal expansion is applied on.

However, as described above, in the suspension board with circuit 1, the opening 15 is formed in the metal supporting board 11 so as to expose the insulating base layer 12 where the head-side terminals 17 are disposed, so that the stress applied on the connecting portion between the connecting terminals 9 of the magnetic head 6 and the head-side terminals 17 can be relaxed in the opening 15 even when the metal supporting board 11 and the slider 7 expand at a different rate, whereby the connecting reliability between the connecting terminals 9 of the magnetic head 6 and the head-side terminals 17 can be improved.

The Second Embodiment

FIG. 4 is an explanatory view illustrating the suspension board with circuit of a second embodiment according to the present invention. In the second embodiment, the same reference numerals are provided for the same members as those in the first embodiment, and the description thereof is omitted.

In the first embodiment described above, all the portions of the metal supporting board 11 within the opening 15 are etched. However, as shown in FIG. 4, in the second embodiment, the etching is applied so as to save the metal supporting board 11 corresponding to each of the head-side terminals 17 to overlap each of the head-side terminals 17 when projected in the laminating direction in the opening 15.

Thus, a first reinforcing portion 21 made of the metal supporting board 11 having a generally circular shape in bottom plan view is formed below the head-side terminals 17 at the slider-mounting region 8.

The diameter of the first reinforcing portion 21 is 5 to 30% larger, or preferably 10 to 20% larger than that of the head-side terminals 17, and is in the range of, for example, 30 to 200 μm, or preferably 50 to 150 μm.

The ratio of area of the portion other than the portion where the first reinforcing portion 21 is formed with respect to the opening 15 is in the range of, for example, 30 to 90%, or preferably 50 to 80%.

In the second embodiment, the degree of rigidity of the suspension board with circuit 1 at the slider mounting region 8 can be enhanced by the rigidity of the first reinforcing portion 21, while capable of attaining the same effect as that of the first embodiment described above.

The Third Embodiment

Figure 5:
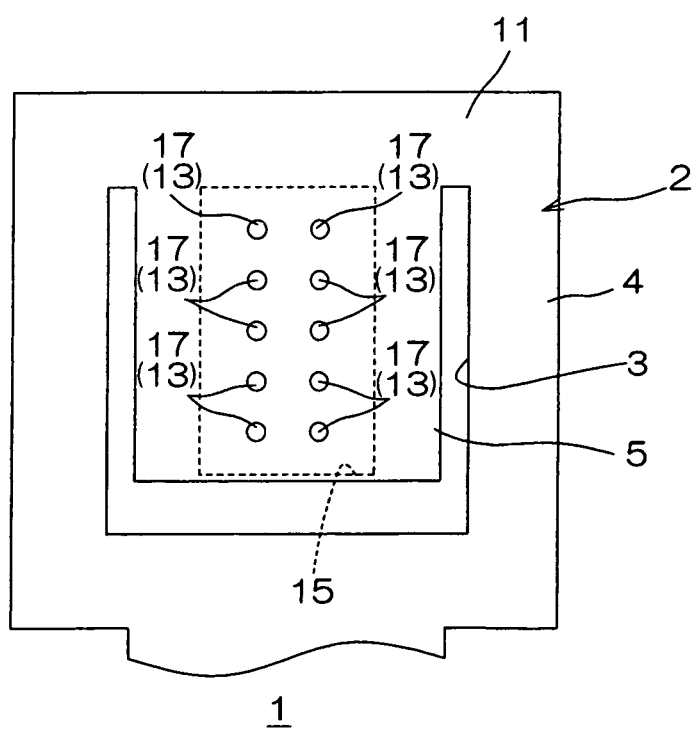
FIG. 5 is an explanatory view (plan view) illustrating the suspension board with circuit of a third embodiment according to the present invention.

FIG. 5 is an explanatory view illustrating the suspension board with circuit of a third embodiment according to the present invention. FIG. 6 is an explanatory view illustrating a modified example of the suspension board with circuit of a third embodiment according to the present invention. In the third embodiment, the same reference numerals are provided for the same members as those in the first and second embodiments, and the description thereof is omitted.

In the first embodiment described above, the opening 15 is formed in a generally rectangular shape extending in the widthwise direction at half part of one side of the lengthwise direction in the slider mounting region 8, and the head-side terminals 17 each are arranged in parallel at spaced intervals to each other in the widthwise direction thereof at half part of one side of the lengthwise direction in the slider mounting region 8. However, the range of formation and the shape of the opening 15, and the number and the arrangement of the head-side terminals 17 are not particularly limited and can be set appropriately corresponding to the slider 7 which is mounted.

Specifically, as shown in FIG. 5, in the third embodiment, the slider mounting region 8 is formed in a generally rectangular shape extending along the lengthwise direction in the tongue portion 5 over the whole area of the lengthwise direction nearly at the widthwise center thereof, and the head-side terminals 17 each are arranged in parallel in two rows along the lengthwise direction at the slider mounting region 8.

In the third embodiment, the connecting terminals 9 of the magnetic head 6 are formed at the under surface of the slider 7, and the slider 7 with the magnetic head 6 mounted thereon is disposed at the slider mounting region 8 so as to be mounted on the head-side terminals 17. The connecting terminals 9 of the magnetic head 6 and the head-side terminals 17 are connected.

A spacing between the lengthwise outer end edge of the head-side terminal 17 which is arranged most outside in the lengthwise direction and the lengthwise outer end edge of the opening 15 is in the range of, for example, 20 to 500 μm, or preferably 50 to 200 μm. A spacing between each of the widthwise end edges of the head-side terminals 17 and each of the widthwise end edges of the opening 15 is in the range of, for example, 20 to 500 μm, or preferably 50 to 200 μm.

In the third embodiment, it is possible to attain the same effect as that of the first embodiment described above.

As shown in FIG. 6, in the third embodiment, the etching is applied so as to save the metal supporting board 11 corresponding to each of the head-side terminals 17 to overlap each of the head-side terminals 17 when projected in the laminating direction in the opening 15, so that the first reinforcing portion 21 made of the metal supporting board 11 having a generally circular shape in bottom plan view can be formed below the head-side terminals 17.

The diameter of the first reinforcing portion 21 is the same as that of the first reinforcing portion 21 in the second embodiment.

The ratio of area of the portion other than the portion where the first reinforcing portion 21 is formed with respect to the opening 15 is in the range of, for example, 30 to 90%, or preferably 50 to 80%.

In the modified example of the third embodiment, it is possible to attain the same effect as that of the second embodiment described above.

The Fourth Embodiment

FIG. 7 is an explanatory view illustrating the suspension board with circuit of a fourth embodiment according to the present invention. In the fourth embodiment, the same reference numerals are provided for the same members as those in the third embodiment, and the description thereof is omitted.

In the third embodiment described above, in the modified example, the first reinforcing portion 21 is formed so as to overlap each of the head-side terminals 17 when projected in the laminating direction corresponding to each of the head-side terminals 17. However, as shown in FIG. 7, in the fourth embodiment, while the first reinforcing portions 21 are formed below the head-side terminals 17, the second reinforcing portions 31 are formed between the first reinforcing portions 21.

The second reinforcing portions 31 are formed from the metal supporting board 11 in a generally circular shape in bottom plan view, and are arranged in one row staggered with the first reinforcing portions 21 in two rows between them so as to be separated from the first reinforcing portions 21.

The diameter of the second reinforcing portion 31 is in the range of, for example, 20 to 200 µm, or preferably 50 to 150 µm.

The ratio of area of the portion other than the portion where the first reinforcing portions 21 and the second reinforcing portions 31 are formed with respect to the opening 15 is in the range of, for example, 20 to 80%, or preferably 30 to 60%.

In the fourth embodiment, it is possible to attain the same effect as that of the third embodiment described above.

While the degree of rigidity of the suspension board with circuit 1 can be enhanced by the rigidity of the second reinforcing portions 31 at the slider mounting region 8, it is possible to dissipate heat from the magnetic head 6 using the second reinforcing portions 31.

Other Modified Examples

In the second, third, and fourth embodiments described above, the first reinforcing portions 21 and the second reinforcing portions 31 are formed in a generally circular shape in bottom plan view. However, the shape of the first reinforcing portions 21 and the second reinforcing portions 31 is not particularly limited, and for example, they can also be formed in a generally rectangular shape in bottom plan view or in a generally hexagonal shape in bottom plan view.

EXAMPLES

While in the following, the present invention is described in further detail with reference to Examples, the present invention is not limited to any of them by no means.

Example

A metal supporting board made of stainless steel having a thickness of 20 µm (the coefficient of thermal expansion: $18 \times 10^{-6}/^\circ$ C.) was first prepared (cf. FIG. 3(a)). Then, a varnish of a photosensitive polyamic acid resin was applied to the surface of the metal supporting board and was then dried. Thereafter, the dried varnish was exposed to light and was then developed to be hot cured, so that an insulating base layer made of polyimide having a thickness of 10 µm was formed in the above-mentioned pattern (cf. FIG. 3(b)).

Next, as conductive thin film, a chromium thin film having a thickness of 0.03 µm and a copper thin film having a thickness of 0.07 µm were successively formed on the surface of the insulating base layer including the metal supporting board by chromium sputtering and copper sputtering. Subsequently, a plating resist in a pattern reverse to the conductive pattern was formed on the surface of the conductive thin film. Then, the conductive pattern having a thickness of 15 µm was formed on the surface of the conductive thin film exposed from the plating resist by electrolytic copper plating. Thereafter, the plating resist and the conductive thin film on the portion where the plating resist was formed were removed by chemical etching (cf. FIG. 3(c)).

Then, six pieces of the head-side terminals having a widthwise length of 60 µm were formed so as to be arranged in parallel with a space of 40 µm to each other in the widthwise direction.

Next, a varnish of a photosensitive polyamic acid resin was applied to the surface of the insulating base layer including the conductive pattern and was then dried. Thereafter, the dried varnish was exposed to light and was then developed to be hot cured, so that an insulating cover layer made of polyimide having a thickness of 5 µm was formed in a pattern covering the wires and exposing the head-side terminals and the external terminals (cf. FIG. 3(d)).

Next, the metal supporting board at the slider mounting region was removed by wet etching using an aqueous ferric chloride solution as an etchant. (cf. FIG. 3(e))

Thus, the cutout portion having a slit width of 100 µm, and the opening having a widthwise length of 600 µm and a lengthwise length of 300 µm while having a generally rectangular shape in bottom plan view were formed.

Thus, the suspension board with circuit was obtained.

Comparative Example

A suspension board with circuit was obtained by performing the same process as in Example described above except that a metal supporting board was not etched in the first etching process.

Evaluation (Heat-Cold Cycling Test)

While mounting the slider (the coefficient of thermal expansion: $7.5 \times 10^{-6}/^\circ$ C.) on the slider mounting region of the suspension board with circuit obtained in the Example and the Comparative Example, the connecting terminals of the magnetic head were solder connected to the head-side terminals, so that the suspension board with circuit where the slider was mounted was obtained. The suspension board with circuit was heated from −40° C. to 150° C. and was then cooled from 150° C. to −40° C. Taking this as one cycle, 1000 cycles of heating and cooling were performed to observe the connecting portion between the connecting terminals of the magnetic head and the head-side terminals.

In the suspension board with circuit in the Examples, there was no change in the connecting portion. On the other hand, in the suspension board with circuit in the Comparative Example, a crack occurred in the connecting portion.

While the illustrative embodiments of the present invention are provided in the above description, such is for illustrative purpose only and it is not to be construed as limiting the scope of the present invention. Modification and variation of the present invention that will be obvious to those skilled in the art is to be covered by the following claims.

What is claimed is:

1. A suspension board with circuit comprising:
a metal supporting board, an insulating layer formed on the metal supporting board, and a conductive pattern formed on the insulating layer and having a terminal portion connected to a connecting terminal of a magnetic head mounted on a slider; wherein
a slider mounting region where the slider is disposed is defined;
a plurality of the terminal portions are spaced apart from each other in the slider mounting region; and in the metal supporting board, an opening which opens so as to expose the insulating layer where the terminal portions are disposed is formed at the slider mounting region, wherein an under surface of the insulating layer is exposed over an entire area of the opening.

2. The suspension board with circuit according to claim 1, wherein a first reinforcing portion made of the metal supporting board is provided corresponding to the terminal portion in the opening at the slider mounting region.

3. The suspension board with circuit according to claim 2, wherein a second reinforcing portion made of the metal supporting board is provided so as to be separated from the first reinforcing portion in the opening at the slider mounting region.

4. The suspension board with circuit according to claim 3, wherein the second reinforcing portion comprises a plurality of individual metal reinforcing pieces.

5. The suspension board with circuit according to claim 4, wherein each of the individual metal reinforcing pieces has a generally circular shape in a bottom plan view.

6. The suspension board with circuit according to claim 2, wherein the first reinforcing portion comprises a plurality of individual metal reinforcing pieces respectively formed below the terminal portions.

7. The suspension board with circuit according to claim 6, wherein each of the individual metal reinforcing pieces has a generally circular shape in a bottom plan view.

\* \* \* \* \*